March 18, 1952     E. A. STONE     2,589,891
EAR NOTCHING TOOL
Filed Oct. 31, 1949
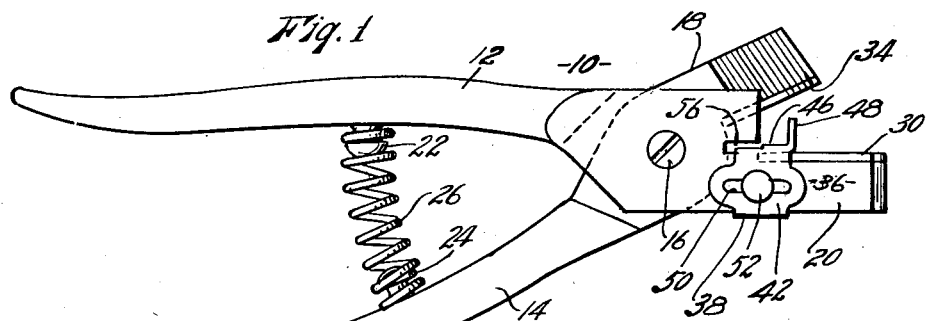
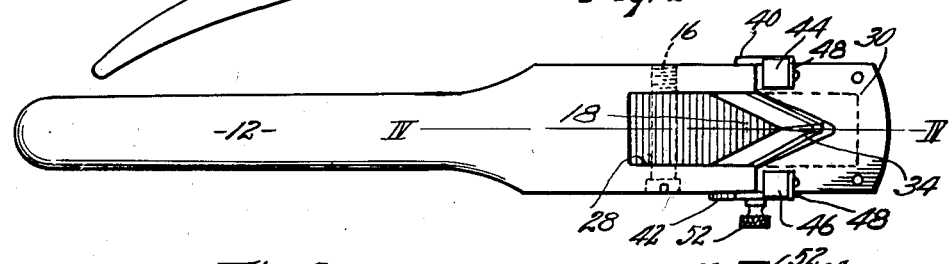
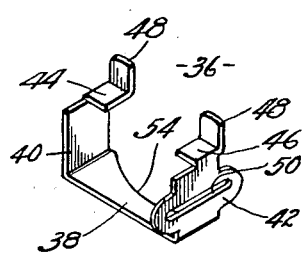
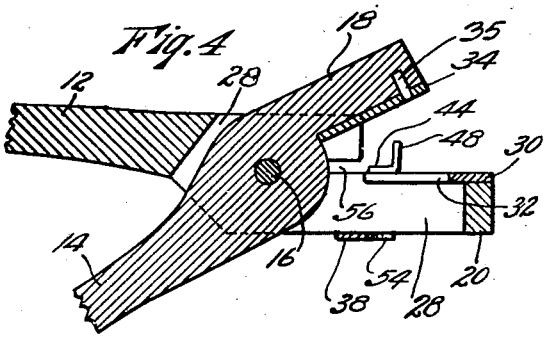
INVENTOR,
Edwal A. Stone,
BY Roy E. Hamilton,
Attorney.

UNITED STATES PATENT OFFICE 2,589,891

EAR NOTCHING TOOL

Edwal A. Stone, Kansas City, Mo.

Application October 31, 1949, Serial No. 124,703

2 Claims. (Cl. 128—316)

This invention relates to improvements in animal markers and has for its object an animal marker by means of which the ear of the animal may be notched to a predetermined depth so that the owner thereof may readily identify his property.

The principal object of the present invention is the provision of a pair of punch pliers having a longitudinally adjustable gauge mounted on one of the jaws thereof whereby the depth of insertion of an animal's ear between the jaws may be determined.

Another object of this invention is the provision of a shearing tool operable whereby the animal's ear may be notched to any predetermined depth.

With these objects in view as well as other objects which will appear during the course of the specification, reference will be had to the drawing wherein:

Fig. 1 is a side elevational view of an ear notching tool embodying this invention.

Fig. 2 is a plan view of the ear notching tool.

Fig. 3 is an inverted plan view of the tool.

Fig. 4 is a fragmentary sectional view taken on line IV—IV of Fig. 2.

Fig. 5 is a perspective view of the gauge detached from the pliers.

Throughout the several views, like reference numerals refer to similar parts and the numeral 10 designates a tool of substantially plier form having handles 12 and 14 which overlap and cross each other to receive a pivot pin 16 and terminate respectively in jaws 18 and 20. Handle 12 is provided with a button 22 and handle 14 with a button 24. The buttons 22 and 24 are positioned to receive the opposite end portions of compression spring 26 by means of which the handles are normally held in the open position as shown in Fig. 1. The operating end portion of handle 12 is slotted at 28 to receive the relative narrow jaw 18 therethrough.

Jaw 20 is substantially rectangular in cross-section and is provided on its upper surface with a steel die plate 30 formed to present a notch 32 at its inner portion. The jaw 18 is formed V-shape at its outer end and is provided at its lower surface with a steel plate 34 which serves as a punch to operate in conjunction with die plate 30 to shear a notch in the animal's ear as the handles 12 and 14 are forced together with the animal's ear positioned between the jaws. Plate 34 is secured to jaws 18 by dowel pin 35.

To regulate the depth of insertion of the animal's ear between the jaws a gauge 36 is provided for longitudinal adjustment along jaw 20.

This gauge 36, best shown in Fig. 5, is formed from sheet metal in substantially U-form to present a cross bar 38, legs 40 and 42 and inwardly projecting lips 44 and 46 that rest on top of plate 30. Each of the lips has an upwardly projecting stop 48 which serves to contact the ear as the tool is positioned thereon to regulate the depth of the notch to be cut from the ear.

It will be noted that side member 42 is elongated and provided with a slot 50 through which a set screw 52 is inserted. This set screw is threaded into the body of member 20 and serves to grip side wall 42 to secure the gauge in position when the screw is tightened thereagainst. To set the gauge the screw is loosened and the gauge is moved to the proper position and again set.

It is quite apparent that any desired depth of notch may be formed in an animal's ear. A notch in a pig's ear is usually shallower than that formed in a steer's ear. In order to permit free passage of the clippings from the ears to fall from the tool the cross-bar 38 is cut away at 54. Notches 56 formed in the body of member 12 permit the gauge to be so positioned that the lips 44 and 46 will be positioned in the respective notches 56 and the stops will be at their extreme inward positions.

What I claim as new and desire to protect by Letters Patent is:

1. An ear marking tool comprising a pair of relatively pivoted jaws, one of said jaws carrying a V-shaped shearing punch and the other jaw carrying a V-shaped die, operable when relatively rotated to sever a V-shaped section from an animal's ear, and a gauge longitudinally adjustable on one of said jaws to present stops to limit the depth of insertion of the animal's ear between said jaws whereby notches of predetermined depths may be formed therein, said gauge comprising a U-shaped member disposed slidably about the outer portion of said die carrying jaw and having the free end portions of the legs thereof formed to present inwardly turned lips extending over the inner surface of said die carrying jaw to points adjacent the die opening thereof, and stops extending upwardly from said lips and adapted to receive said punch carrying jaw therebetween.

2. An ear marking tool comprising a pair of pliers having relatively pivoted jaws adapted to be operated to shear a notch in an animal's ear, one of said jaws carrying a punch and the other a die, a gauge mounted on said die carrying jaw for longitudinal adjustment therealong, said gauge comprising a substantially U-shaped member disposed slidably about the outer portion of said die carrying jaw and having legs extending toward said punch carrying arm to form stops, said stops being offset inwardly from the sides of said jaws to points adjacent the die opening, and means to secure said gauge in a predetermined position on said jaw whereby it will serve to gauge the depth of the notch to be formed in the animal's ear.

EDWAL A. STONE.

REFERENCES CITED

The following references are of record in the file of this patent:

UNITED STATES PATENTS

| Number | Name | Date |
|---|---|---|
| 114,674 | Griffith | May 9, 1871 |
| 267,282 | Tigniere | Nov. 7, 1882 |
| 422,041 | Silsby | Feb. 25, 1890 |
| 654,183 | Sayre | July 24, 1900 |

FOREIGN PATENTS

| Number | Country | Date |
|---|---|---|
| 271,652 | Italy | Feb. 15, 1930 |